US006762751B2

(12) United States Patent
Kuan

(10) Patent No.: US 6,762,751 B2
(45) Date of Patent: Jul. 13, 2004

(54) OPTICAL POINTING DEVICE

(75) Inventor: Yen-Liang Kuan, Jia Yi (TW)

(73) Assignee: Behavior Tech Computer Corporation, Taipei (TW)

( * ) Notice: Subject to any disclaimer, the term of this patent is extended or adjusted under 35 U.S.C. 154(b) by 214 days.

(21) Appl. No.: 10/015,745

(22) Filed: Dec. 17, 2001

(65) Prior Publication Data

US 2003/0112221 A1 Jun. 19, 2003

(51) Int. Cl.$^7$ ................................................. G09G 5/08
(52) U.S. Cl. .................... 345/166; 345/163; 345/157
(58) Field of Search ............................ 345/156–169, 345/173–179; 250/234, 239, 221; 273/148 B; 463/37–38; 382/313, 321, 312

(56) References Cited

U.S. PATENT DOCUMENTS

| | | | | |
|---|---|---|---|---|
| 5,424,756 A | * | 6/1995 | Ho et al. ..................... | 345/158 |
| 5,801,681 A | * | 9/1998 | Sayag ......................... | 345/157 |
| 6,057,540 A | * | 5/2000 | Gordon et al. .............. | 250/221 |
| 6,243,080 B1 | * | 6/2001 | Molne ......................... | 345/173 |
| 6,452,683 B1 | * | 9/2002 | Kinrot et al. ............... | 356/499 |
| 6,501,460 B1 | * | 12/2002 | Paik et al. ................... | 345/163 |
| 6,541,762 B2 | * | 4/2003 | Kang et al. .................. | 250/239 |
| 6,621,483 B2 | * | 9/2003 | Wallace et al. ............. | 345/157 |

* cited by examiner

Primary Examiner—Lun-Yi Lao
(74) Attorney, Agent, or Firm—Rosenberg, Klein & Lee

(57) ABSTRACT

An optical pointing device includes a base which can be a casing of a peripheral device of a computer system having a display using a cursor or a portion of a display system using a cursor. The base defines a cavity having an opening in a surface of the base. An optical sensing system is received and retained in the cavity. The optical sensing system includes a lens located in front of the optical sensing system for directing optical signals toward/away from the optical sensing system. A light-transmitting panel is removably and selectively mounted to the opening of the cavity for covering the cavity. The distance between the panel and the lens is substantially equal to the focusing length of the lens whereby an object moving on the panel can be clearly detected by the optical sensing system and then converted into a corresponding first electrical signal to drive the cursor in a first direction. The pointing device can be placed on a fixed surface with the panel removed and moved with respect to the fixed surface for generating a second electrical signal to drive the cursor in an opposite second direction. A panel detection element is mounted in the body for detecting the presence of the panel and serves as a switch for switching the pointing device between forward moving mode where the first electrical signal is generated and rearward moving mode where the second electrical signal is generated.

7 Claims, 4 Drawing Sheets

OPTICAL POINTING DEVICE

FIELD OF THE INVENTION

The present invention generally relates to a pointing device for controlling a pointer or cursor in a display, such as a computer monitor screen, and in particular to an optical pointing device selectively operable in forward moving mode and rearward moving mode.

BACKGROUND OF THE INVENTION

Pointing devices are widely used in computer systems and a variety of electronic devices for moving a cursor or pointer shown on a display to control/operate for example pull-down menu bars and selective actuation of certain functions of the electronic device. Examples of the pointing devices include computer mice, joysticks, tracking balls and touch pads. Most of the conventional pointing devices are operated mechanically, such as moving a part relative to another part and applying pressure to certain parts.

The conventional mechanical pointing devices require conversion of mechanical signals into optical signal which are then further converted into electrical signals to be transferred to an associated computer system. For example, a computer mouse or a tracking ball comprises a rolling sphere which is mechanically rotated when the computer mouse or tracking ball is in operation. The rotation of the sphere is converted into optical signals by an optical encoding system. The optical signal is then processed by a transducer to generate a corresponding electrical signal. This not only increases costs of the pointing devices, but also complicates the operation thereof. Sensitivity of the pointing devices in picking up signals may also be adversely affected by such a complicated structure, especially by the mechanical parts thereof.

It is thus desirable to provide a pointing device to alleviate the above mentioned problems.

SUMMARY OF THE INVENTION

Accordingly, an object of the present invention is to provide a pointing device comprising no moving parts for simplifying the structure and operation thereof and reducing costs of manufacturing and maintenance.

Another object of the present invention is to provide a pointing device operable in both forward moving mode and rearward moving mode.

A further object of the present invention is to provide an optical pointing device which generates optical signals and optical signals are converted into electrical signals directly with no mechanical signal required.

To achieve the above objects, in accordance with the present invention, there is provided an optical pointing device comprising a base which can be for example a casing of a computer mouse. The base defines a cavity having an opening in a surface of the base. An optical sensing system is received and retained in the cavity. The optical sensing system comprises a lens located in front of the optical sensing system for directing optical signals toward/away from the optical sensing system. A light-transmitting panel is removably and selectively mounted to the opening of the cavity for covering the cavity. The distance between the panel and the lens is substantially equal to the focusing length of the lens whereby an object moving on the panel can be clearly detected by the optical sensing system and then converted into a corresponding first electrical signal to drive the cursor in a first direction. The pointing device can be placed on a fixed surface with the panel removed and moved with respect to the fixed surface for generating a second electrical signal to drive the cursor in an opposite second direction. A panel detection element is mounted in the body for detecting the presence of the panel and serves as a switch for switching the pointing device between forward moving mode where the first electrical signal is generated and rearward moving mode where the second electrical signal is generated.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
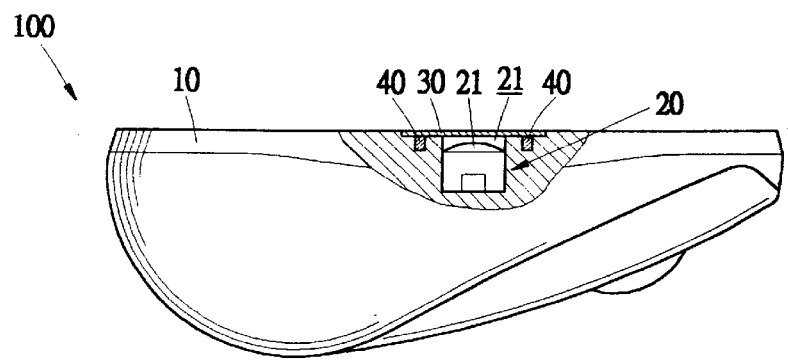
FIG. 1 is a side elevational view showing a computer mouse in which a pointing device constructed in accordance with a first embodiment of the present invention is incorporated, a portion of the computer mouse being broken to show details of the present invention.
Figure 2:
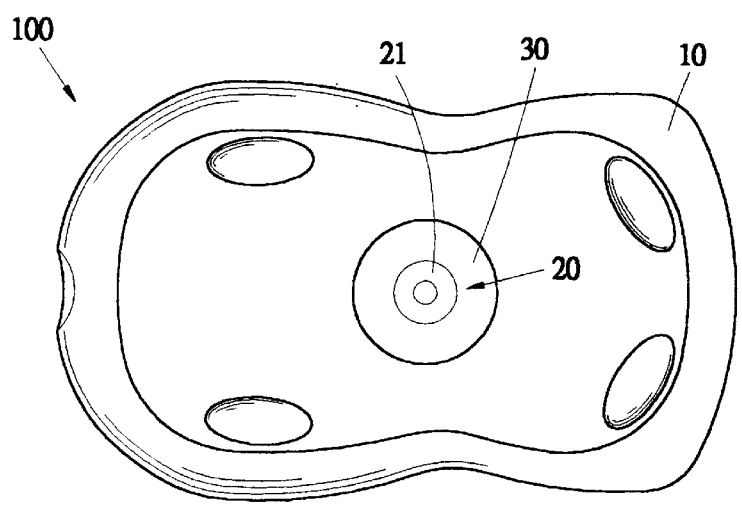
FIG. 2 is a bottom view of the computer mouse of FIG. 1.
Figure 3:
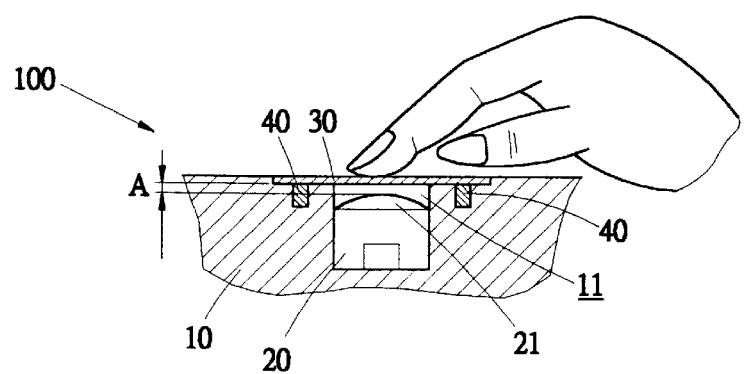
FIG. 3 is an enlarged view of the broken portion of the computer mouse of FIG. 1 with a user's finger placed thereon to demonstrate the operation thereof.

With reference to the drawings and in particular to FIGS. 1–3, a pointing device constructed in accordance with a first embodiment of the present invention, generally designated with reference numeral 100, is shown. The pointing device 100 comprises a body 10 which can be of any type, such as a casing or a base of an electronic/electrical device. For example, the body 10 of the pointing device 100 is a portion of a computer mouse as shown in FIGS. 1–4.

The body 10 defines a cavity 11 forming an opening in a surface (not labeled) of body 10. An optical sensing system 20 is received and retained in the cavity 11. The optical sensing system 20 can be of any optical sensor which is capable of receiving and/or emitting optical signals through the opening of the cavity 11. The optical sensing system 20 comprises a lens 21 having a predetermined focusing length. The lens 21 is received and retained in the cavity 11 in front of the optical sensing system 20 for directing external optical signals toward the optical sensing system 20 and/or forwarding optical signal emitted by the optical sensing system 20 in given directions. Thus, when an object, such as a user's finger (FIG. 3), moves in front of the optical sensing system 20, images of the moving object are detected by the optical sensing system 20 by picking up optical signals from the object through the lens 21.

A light-transmitting panel 30 is attached to the body 11 and covers the opening of the cavity 11. Preferably and as shown in FIGS. 1–3, the panel 30 is removably attached to the body 11 whereby a continuous, smooth surface is formed between the surface of the body 10 and the panel 30. The lens 21 is spaced from the panel 30 a distance A. The distance A and the focusing length of the lens 21 are selected to be substantially identical whereby the image of the object moving/sliding along the panel 30 is focused onto and thus detected by the optical sensing system 20. If the distance A and the focusing length of the lens 21 are not identical, the image of the object may not be clearly identified and no detection of the object can be taken. This arrangement helps suppressing "noise" caused by any object undesiredly moving above the panel 30.

The panel 30 is selectively removed from the body 10. Panel detection elements 40 are mounted to the body 10 for detecting the presence of the panel 30. When the panel detection elements 40 detect the panel 30, the optical sensing system 20 emits optical signal through the lens 21 and receives reflected signal from an object sliding or moving along the panel 30. The images of the moving object are be detected by the optical sensing system 20. The optical sensing system 20 processes the detected optical signal in such a way that an electrical signal corresponding to the optical signal is generated and sent to an associated computer system (not shown) which drives a cursor shown on a display of the computer system to move in the same direction of the moving image of the object. Apparently, the detected optical signal can be processed in such a way to move the cursor in a direction opposite to the movement of the object along the panel 30.

Figure 4:
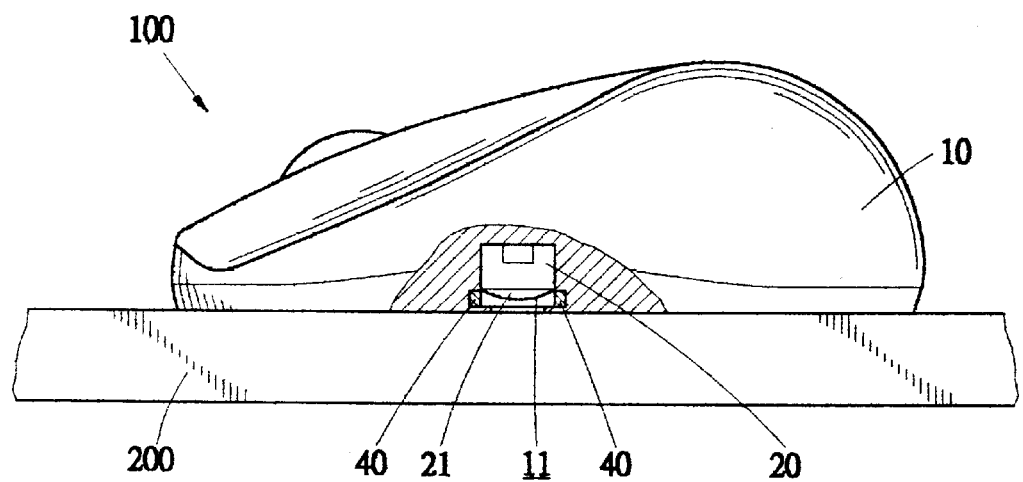
FIG. 4 is a side elevational view, similar to FIG. 1, but showing another application of the pointing device of the first embodiment.

Another way to use the pointing device 100 of the present invention is shown in FIG. 4 wherein the light-transmitting panel 30 is removed. The optical sensing system 20 or related control circuit detects the absence of the panel 30 by means of the panel detection elements 40. In the application illustrated in FIG. 4, the opening of the cavity 11 is formed in a bottom face of a computer mouse which is also referred to as body 10 of the pointing device 100. The mouse 10 is placed and moved on a mouse pad 200 or other flat surface. The optical sensing system 20 emits optical signal toward the mouse pad 200 via the lens 21 and receives a reflected signal from the mouse pad 200 via the lens 21. When the mouse 10 is moved with respect to the mouse pad 200, a relative movement of the mouse pad 200 with respect to the optical sensing system 20 is detected. The relative movement is then converted into movement of a cursor on a display of for example a computer system (not shown) connected to the mouse 10.

It is noted that in the application shown in FIGS. 1–3, the pointing device 100 of the present invention is fixed while object detected by the optical sensing system 20 is moving on the panel 30, but in the application shown in FIG. 4, the object detected by the optical sensing system 20 is fixed while the pointing device 100 itself moves with respect to the object detected. This causes the movement of the cursor in opposite direction if the signals detected in the application of FIG. 4 is not processed so as to reverse the direction thereof. On the other hand, the two applications illustrated in FIGS. 1–4 allows a software designer or a user to operate the pointing device in a more versatile fashion. That means a user or a software designer may selectively control the cursor in a forward moving mode or in a rearward moving mode. In this respect, the panel detection elements 40 are of importance in determining the moving direction of the cursor and may thus serve as a switch between the forward moving mode and the rearward moving mode.

Figure 5:
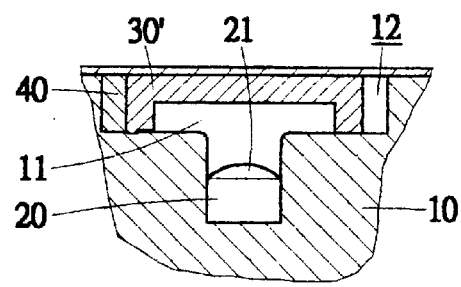
FIG. 5 is similar to FIG. 3 but showing a pointing device constructed in accordance with a second embodiment of the present invention.

FIG. 5 shows a pointing device in accordance with a second embodiment of the present invention. In the second embodiment, the pointing device comprises a body 10 having a surface (not labeled) in which a channel 12 is defined for movably receiving a light-transmitting panel 30'. A cavity 11 is defined in a bottom of the channel 12 whereby an opening of the cavity 11 formed in the bottom of the channel 12 is completely covered by the panel 30' regardless the position of the panel 30' within the channel 12. An optical sensing system 20 which comprises a lens 21 is received and retained in the cavity 11. The lens 21 is selected and positioned to focus an image of an object (not shown) sliding along the panel 30' toward the optical sensing system 20. A panel detection element 40 is arranged at an end of the channel 12, while no panel detection element 40 is arranged at an opposite end of the channel 12. A user may move the panel 30' within the channel 12 between the ends whereby the panel detection element 40 may be selectively engaged by the panel 30'. In this respect, the panel detection element 40 functions as a switch for switching the operation mode of the pointing device 100 between forward moving mode and rearward moving mode.

Figure 6:
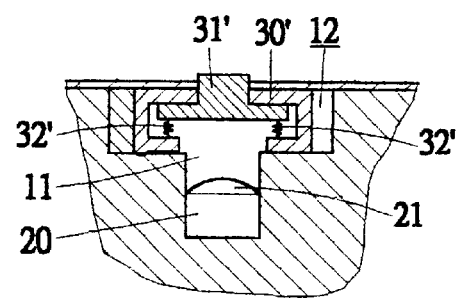
FIG. 6 is similar to FIG. 3 but showing a pointing device constructed in accordance with a third embodiment of the present invention.

FIG. 6 shows a pointing device in accordance with a third embodiment of the present invention which is similar to the second embodiment discussed with reference to FIG. 5. Thus similar parts will not be described again unless they are related to the description of newly added parts of the third embodiment. In the third embodiment, the light-transmitting panel 30' is formed with a bore (not labeled) in which a control button 31' made of light-transmitting material is movably received. The control button 31' is limited to moved between an actuated position and a non-actuated position. Biasing elements 32', such as springs, are provided between the control button 31' and the panel 30' for biasing the button 31' to the non-actuated position where the button 31' partially projects beyond the panel 30'. The button 31' is dimensioned and positioned such that when the button 31' is depressed against the biasing elements 32' to be substantially flush with the panel 30' (the actuated position), the distance between the button 31' and the lens 21 is substantially equal to the focusing length of the length 21 and an image of an object moving along the panel 30' can be properly focused onto the optical sensing system 20. When the button 31' is at the non-actuated position where the button 31' projects beyond the panel 30', the image of the object cannot be correctly focused onto the optical sensing system 20 and no detection of the movement of the object can be done. This arrangement avoids undesired activation of the optical sensing system 20.

Figure 7:
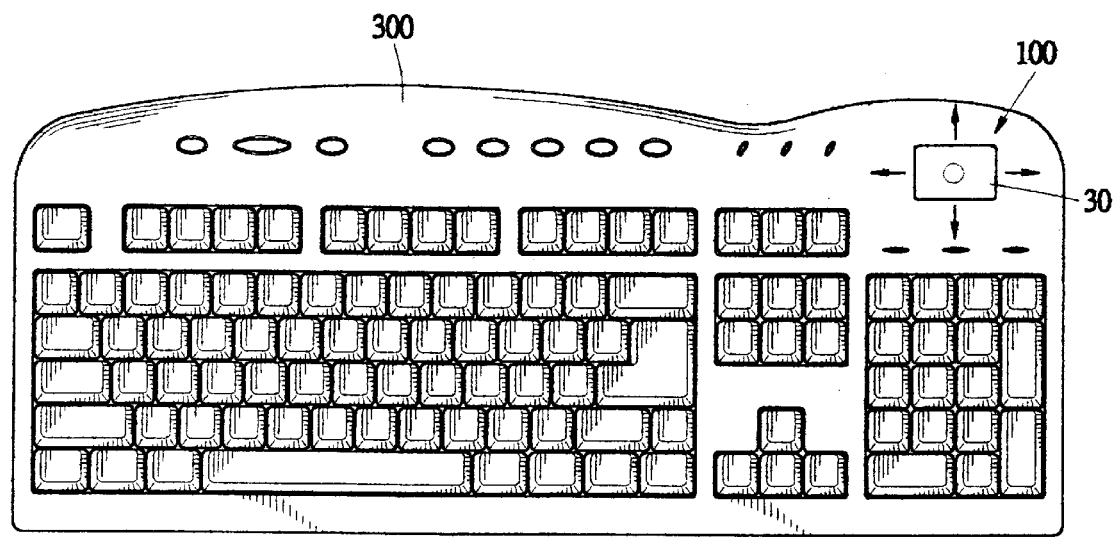
FIG. 7 is a plan view of a computer keyboard demonstrating another application of the pointing device in accordance with the present invention.
Figure 8:
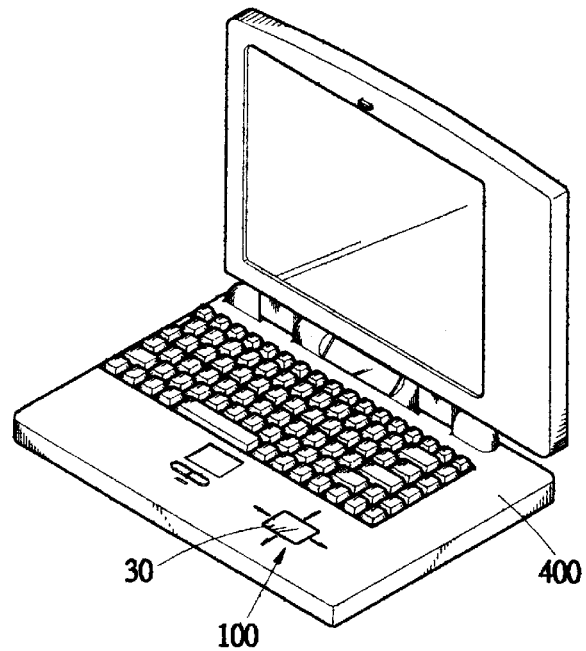
FIG. 8 is a perspective view of a notebook computer demonstrating a further application of the pointing device in accordance with the present invention.
Figure 9:
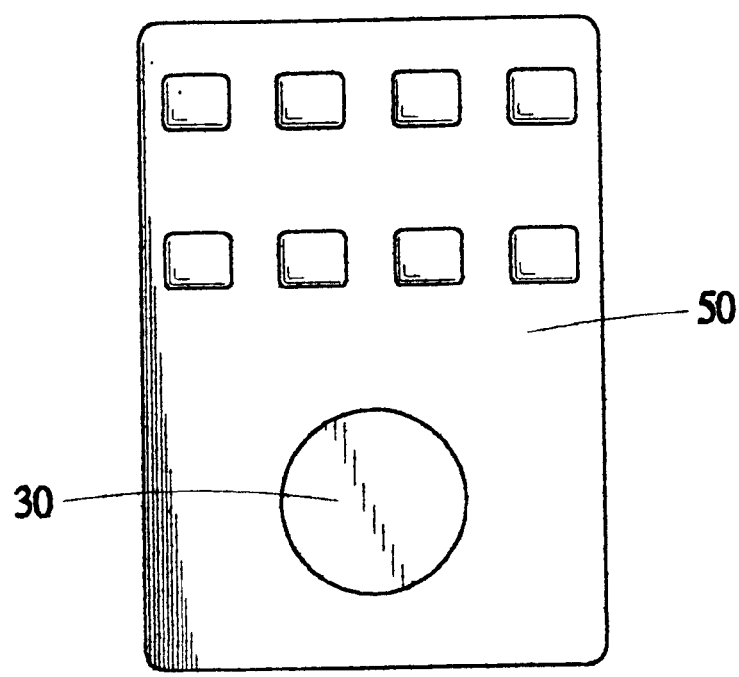
FIG. 9 is a plan view of a remote control for an image projection device demonstrating a further application of the pointing device of the present invention.

FIGS. 7–9 show applications of the pointing device of the present invention in (1) a computer keyboard 300 wherein the panel 30 of the pointing device 100 is substantially flush with a top face of the keyboard 300, (2) a notebook computer 400 wherein the panel 30 of the pointing device 100 is substantially flush with a face of the notebook computer 400, and (3) a remote control 50 of an image projecting device (not shown) wherein the panel 30 is substantially flush with a surface of the remote control 5. In all cases, a user may place one of his or her fingers on the panel 30 and moves the finger relative to the panel 30 to drive a cursor of a display in association with a computer system or to which the keyboard 300 in connected, or the notebook computer 400 or a projecting device wirelessly linked to the remote control 50.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A pointing device comprising:
   a body defining a cavity therein, the cavity forming an opening in a surface of the body;
   an optical sensing system retained in the cavity, the optical sensing system comprising a lens located in front thereof for directing optical signals away from/toward the optical sensing system;
   a light-transmitting panel removably and selectively mounted to the body and covering the cavity adapted to support an object moving thereon; and,
   a panel detection element mounted in the body to detect a presence of the panel;
   wherein the optical sensing system is adapted to receive an optical signal representing movement of the object on the panel and generate an electrical signal corresponding to the optical signal.

2. The pointing device as claimed in claim 1, wherein the body comprises a portion of a computer mouse.

3. The pointing device as claimed in claim 1, wherein the body comprises a portion of a keyboard.

4. The pointing device as claimed in claim 1, wherein the body comprises a portion of a notebook computer.

5. The pointing device as claimed in claim 1, wherein the lens has a focusing length, the panel being spaced from the lens a distance substantially equal to the focusing length.

6. The pointing device as claimed in claim 1, wherein the panel has a bore formed therein within which a light-transmitting button is received, the button being movable between first and second positions, at least one biasing element being provided between the button and the panel to bias the button toward the first position where a distance between the button and the lens is different from a focusing length of the lens, a distance between the button and the lens being substantially equal to the focusing length of the lens when the button is at the second position.

7. A pointing device comprising:
   a body defining a cavity therein, the cavity forming an opening in a surface of the body, the body having a channel formed therein;
   an optical sensing system retained in the cavity, the optical sensing system comprising a lens located in front thereof for directing optical signals away from/toward the optical sensing system; and
   a light-transmitting panel removably and selectively mounted to the body and covering the cavity adapted to support an object moving thereon, the panel being received and movable between positions, the cavity being covered by the panel regardless of the position of the panel;
   wherein the optical sensing system is adapted to receive an optical signal representing movement of the object on the panel and generate an electrical signal corresponding to the optical signal.

\* \* \* \* \*